(12) United States Patent
Stein et al.

(10) Patent No.: US 8,577,002 B2
(45) Date of Patent: Nov. 5, 2013

(54) CALL SCREENING SYSTEM AND METHOD

(75) Inventors: Matthew Jason Stein, Maple (CA); Robert Gordon Thompson, Toronto (CA); Edmund Chislett, Aurora (CA)

(73) Assignee: Primus Telecommunications Canada, Inc., Toronto (CA)

( * ) Notice: Subject to any disclaimer, the term of this patent is extended or adjusted under 35 U.S.C. 154(b) by 250 days.

(21) Appl. No.: 12/673,377

(22) PCT Filed: Aug. 13, 2008

(86) PCT No.: PCT/CA2008/001465
§ 371 (c)(1),
(2), (4) Date: Feb. 18, 2011

(87) PCT Pub. No.: WO2009/021332
PCT Pub. Date: Feb. 19, 2009

(65) Prior Publication Data
US 2011/0170680 A1    Jul. 14, 2011

(30) Foreign Application Priority Data
Aug. 15, 2007    (CA) ...................................... 2597377

(51) Int. Cl.
*H04M 1/56*    (2006.01)
*H04M 15/06*    (2006.01)
*H04M 3/42*    (2006.01)

(52) U.S. Cl.
USPC ................................ 379/142.06; 379/210.02

(58) Field of Classification Search
USPC .................. 379/142.01, 142.05, 142.06, 188, 379/207.13, 207.15, 210.02, 211.01
See application file for complete search history.

(56) References Cited

U.S. PATENT DOCUMENTS

| | | | |
|---|---|---|---|
| 6,289,084 B1 | 9/2001 | Bushnell | |
| 6,990,187 B2 | 1/2006 | MacNamara et al. | |
| 7,027,576 B2 | 4/2006 | Schwab | |
| 7,236,577 B2* | 6/2007 | Lection et al. | 379/142.05 |
| 7,295,660 B1 | 11/2007 | Higginbotham et al. | |
| 8,014,500 B2* | 9/2011 | Chou | 379/88.19 |
| 2003/0072426 A1* | 4/2003 | Davidson et al. | 379/142.01 |
| 2005/0185784 A1 | 8/2005 | Chiu et al. | |
| 2006/0239429 A1* | 10/2006 | Koch et al. | 379/201.01 |
| 2008/0084975 A1* | 4/2008 | Schwartz | 379/88.22 |

OTHER PUBLICATIONS

International Searching Authority, Written Opinion International Application No. PCT/CA2008/001465 mailed Nov. 12, 2008, 5pgs.

* cited by examiner

*Primary Examiner* — Quoc D Tran
(74) *Attorney, Agent, or Firm* — Duane Morris LLP

(57) ABSTRACT

A system and method for screening telephone calls to a subscriber telephone number comprises a screening list of telephone numbers assigned to suspect callers and rules defining when a telephone number will be added to or removed from the screening list or 'greylist,' and/or modifying a screening value to be assigned to a telephone number in the greylist. Data relating to calls is received from subscribers and processed, and the telephone number is screened in accordance with the rules, based on the screening value assigned to the telephone number and optionally a selected subscriber tolerance level. Subscribers may add any telephone number to a personal list of telephone numbers to be blocked (blacklist) or telephone numbers to be accepted (whitelist).

10 Claims, 13 Drawing Sheets

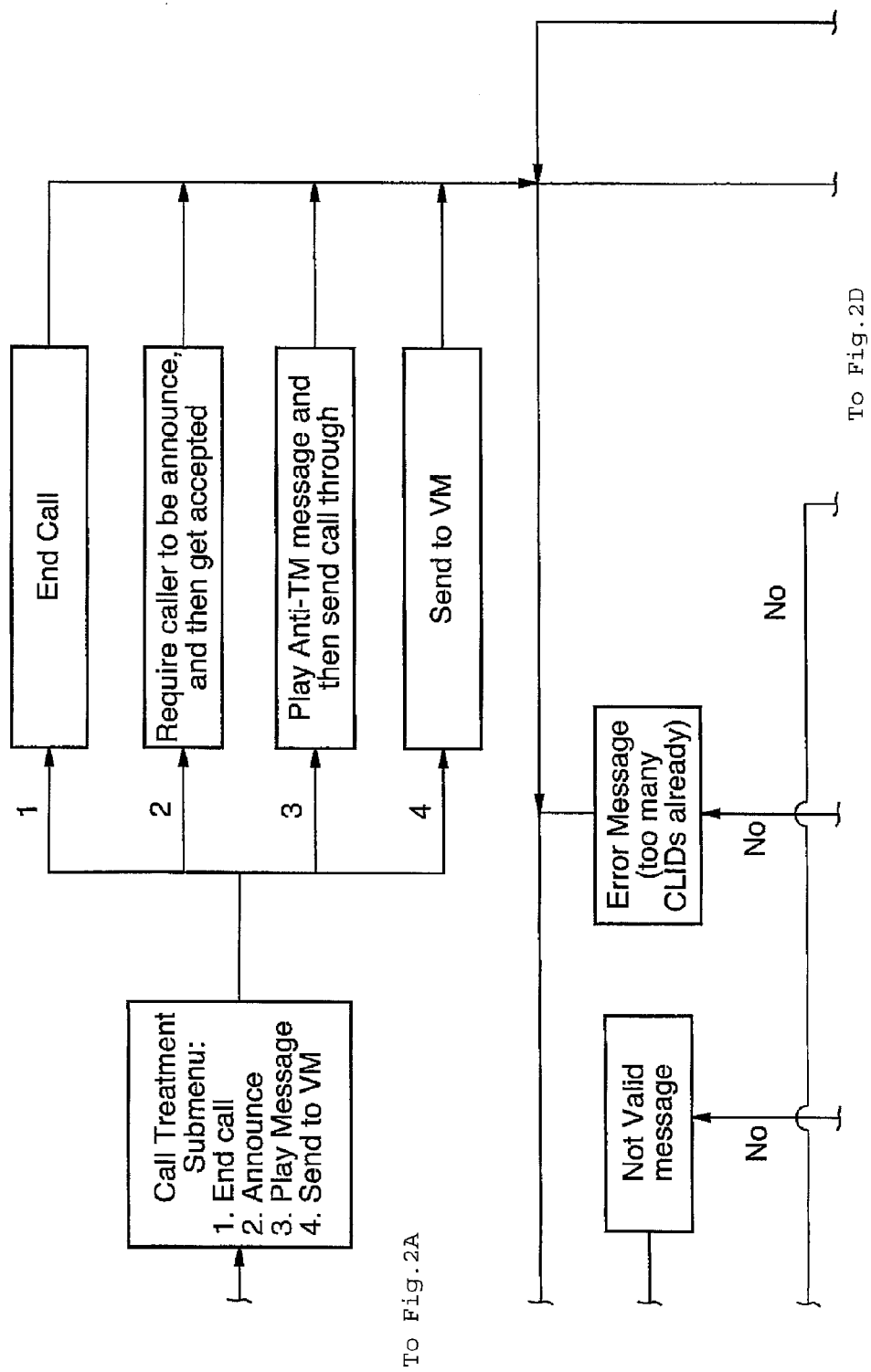

US 8,577,002 B2

CALL SCREENING SYSTEM AND METHOD

FIELD OF THE INVENTION

This invention relates to a call screening system. In particular, the invention relates to an automated system and method for enabling users to block and manage unwanted calls.

BACKGROUND OF THE INVENTION

Unsolicited telemarketing calls have been identified by the Canadian and American governments as a serious problem, as is evident in the fact that both countries have initiated the implementation of national 'do not call lists' (DNCL). Presently there are no regulations in place to curtail telemarketing and other unsolicited telephoning activities. Even if and when such rules are implemented, there will be numerous proposed exceptions to telemarketing rules that will allow charities, political parties, polling companies, businesses with existing business relationship, and others to telemarket to those listed on the DNCL. In addition to those entities who will still be allowed to call numbers registered on the DNCL, there will likely still be noncompliant telemarketers who call numbers listed on the DNCL.

Several means of screening and/or blocking unwanted calls, such as telemarketing calls, currently exist. For example, some telecommunications companies offer call-blocking services which allow subscribers to manually manage all calls from specific callers or category of calls (e.g. all 900 calling codes, all toll-free codes, or all calls where caller identification information is unavailable) that the subscriber identifies. The limitation of such call-blocking services is that they are static lists with little or no exclusion capabilities and may only capture a fraction of the telemarketing calls; the blocking parameters have to be determined in advance; and they may prevent desired calls from reaching the recipient.

There are electronic devices on the market which automatically remove the assigned telephone number of the receiving line from computer dialed telemarketing call-lists, by sending a tone when the user picks up the call that falsely indicates to the calling computer that the number is disconnected, so the computer deletes the phone number. This solution does not spare the user from the disturbance of the call, as the call must be answered in order for the device to take effect, and is limited to computer-initiated telemarketing calls. Also, each user cannot take advantage of the experience of other users.

BRIEF DESCRIPTION OF THE DRAWINGS

In drawings which illustrate by way of example only a preferred embodiment of the invention.

FIGS. 2A, 2B, 2C and 2D illustrate a flowchart depicting one embodiment of a telephone call screen management system (TMG) according to the system and method of the invention.

DETAILED DESCRIPTION OF THE INVENTION

Figure 1:
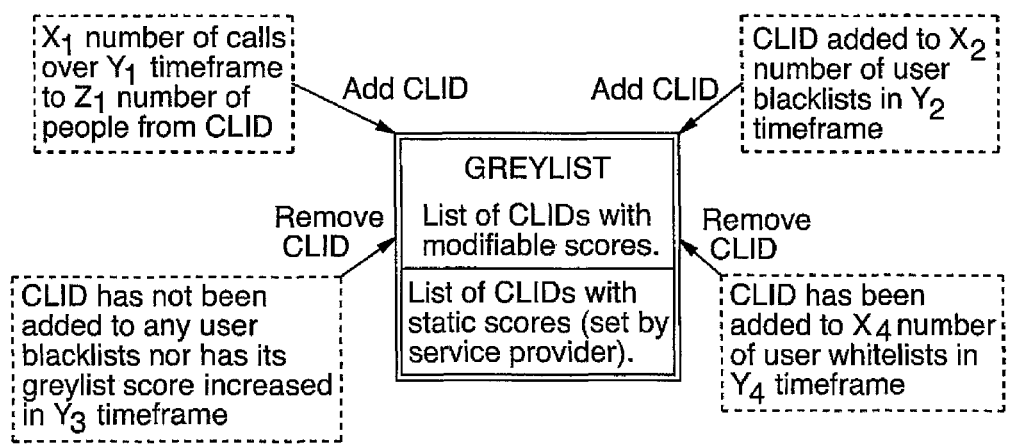
FIG. 1 is a schematic view of a list of suspect callers ('greylist') and examples of rules that may be associated with the greylist.

Embodiments of the present invention are described below and illustrated in the Figures by way of example only. As used in the following description, the term "CLID" means "calling line identification number" and refers to a caller's assigned telephone number, whether or not the identity of the caller can be determined. The telephone number may be a CLID, or may be an Automatic Number Identification (ANI) or a telephone number in any other form. The term CLID is used herein solely by way of example of a telephone number format which can be used in the implementation of the invention.

In one preferred embodiment the invention creates a screening list comprising a dynamic list of suspect CLIDs, or "greylist," comprising a list of CLIDs, for example in the form of telephone numbers in conformance with the North American Numbering Plan (NANP), or in any other desired format, along with score ratings as to the likelihood of the CLID being that of a telemarketer (TM) or other unwanted caller. The greylist may be stored in a database maintained by the service provider at a central office or node, for example as a lookup table, and in the preferred embodiment is made accessible to all subscribers to the call screening feature. The service provider may typically be a telephone company (Telco), and for ease of description the term 'Telco' will be used by way of example throughout this description when referring to the service provider, but the service provider can be any entity administering the call blocking feature whether in a conventional telephone system, VOIP system, or otherwise.

The screening list or "greylist" comprises CLIDs which one or more users have identified as belonging to a telemarketer or other undesirable caller, as determined by the service provider or system administrator. The screening list can also be created and/or updated by the service provider entering call data into the system, for example through one or more algorithms which can identify which of the users in the system may be a telemarketer, examples of which are set out below. The users of the system can manage the incoming CLIDs by utilizing a list of acceptable CLIDs or 'whitelist' (WL) that the user has identified as being friends, family or other acceptable callers; and a list of unacceptable CLIDs or 'blacklist' (BL) that the user has identified as unwanted callers. The blacklist and whitelist may be stored in a client database maintained at the Telco server, and optionally also stored locally at the subscriber's premises in order to reduce the need for communications between the Telco and the subscriber when determining how to treat an incoming call.

According to the invention, the whitelist and blacklist are personal to the subscriber, while the greylist is a communal list, common to all subscribers to the call block system. Thus, depending upon the rules adopted by the service provider or system administrator, a caller may be moved to the greylist by the event of being added to one or more subscriber's blacklists, either over a specific time interval or merely cumulatively.

In an embodiment the invention may comprise a computer program product embodied on a tangible medium for operation on telecommunications hardware for carrying out a method of screening telephone calls, the program product operative to carry out the steps of: a. maintaining on memory in the telecommunications hardware, a screening list of telephone numbers assigned to suspect callers; b. storing on memory in the telecommunications hardware, one or more rules defining when a caller's assigned telephone number will be added to or removed from the screening list, or modifying a screening value to be assigned to a caller's assigned telephone number on the screening list, or both; c. receiving data relating to suspect callers; d. applying the one or more rules to the data; e. adding to or removing from the screening list the caller's assigned telephone number, or modifying the screening value assigned to the caller's assigned telephone number, or both, based on the application of the one or more rules to the data; and f. screening a call from the caller's assigned telephone number to a subscriber in accordance with one or more rules based on the caller's assigned telephone number being in the screening list or on the screening value assigned to the caller's assigned telephone number, or both.

FIG. 1 illustrates examples of some rules that can be implemented to create and maintain the greylist. It will be appreciated that these rules are provided by way of non-limiting example solely to illustrate the principles of the invention.

As illustrated in FIG. 1, the greylist comprises a sublist of CLIDs with their associated modifiable scores. The first sublist is populated automatically by applying rules to database queries. These rules may for example include the following:

1. Add to the greylist any CLID that makes over $X_1$ number of calls over $Y_1$ timeframe to $Z_1$ number of people;
2. Add to the greylist any CLID that has been added to $X_2$ number of user blacklists over a time interval of $Y_2$;
3. Remove from the greylist any CLID that has not been added to any user blacklists and who's greylist score has not increased over a time interval of $Y_3$; and/or
4. Remove from the greylist any CLID that has been added to $X_4$ number of user whitelists (users' independent lists of CLIDs that they have identified as being friends or family, stored on the client database) in $Y_4$ timeframe, where the variables X, Y, and Z are threshold values set by the Telco (or other service provider or administrator of the system).

Whereas each individual subscriber determines whether a CLID should be assigned to his or her blacklist or whitelist, and effects this by manual assignment of a CLID to a particular list (for example using their dial pad or a voice recognition menu system), rules such as these are used to automatically assign a CLID to the greylist. In this embodiment, a CLID is added to the greylist based on data received from one or more subscribers (as dictated by the rules) and is assigned an initial score or 'screening value' by default. The screening value of a particular CLID is modified as further data relating to the CLID is received from subscribers. Once on the greylist, the CLID is flagged as a potential telemarketer (or other unwanted caller) for all subscribers to the system. Thus, the more subscribers there are, the faster unwanted callers become listed on the greylist and the entire community of subscribers benefits from the experiences of the other subscribers.

Preferably the greylist is associated with a second sublist that is populated by the service provider setting the scores associated with particular CLIDs. These scores cannot be modified by user input. One purpose for this sublist may be to store CLIDs that should never be flagged as a telemarketer, for example, essentially creating a "global whitelist." For example, it may be desirable to ensure that certain CLIDs associated with government departments, police, telephone carriers, etc., and/or the service provider itself, are never blocked and cannot be inadvertently assigned to a greylist or blacklist.

The greylist is maintained and managed by the service provider, for example a Telco. No hardware other than the telephone equipment normally used by the user at their premises to make and receive telephone calls is required. A conventional telephone set may be modified to store the whitelist and/or blacklist, which as noted above will allow the subscriber's equipment to determine how to treat an incoming call without the need for communications between the Telco and the subscriber. However, in an embodiment of the invention the decision to route or block the call can be made at a routing point, for example the Telco's central office or node.

Figure 4:
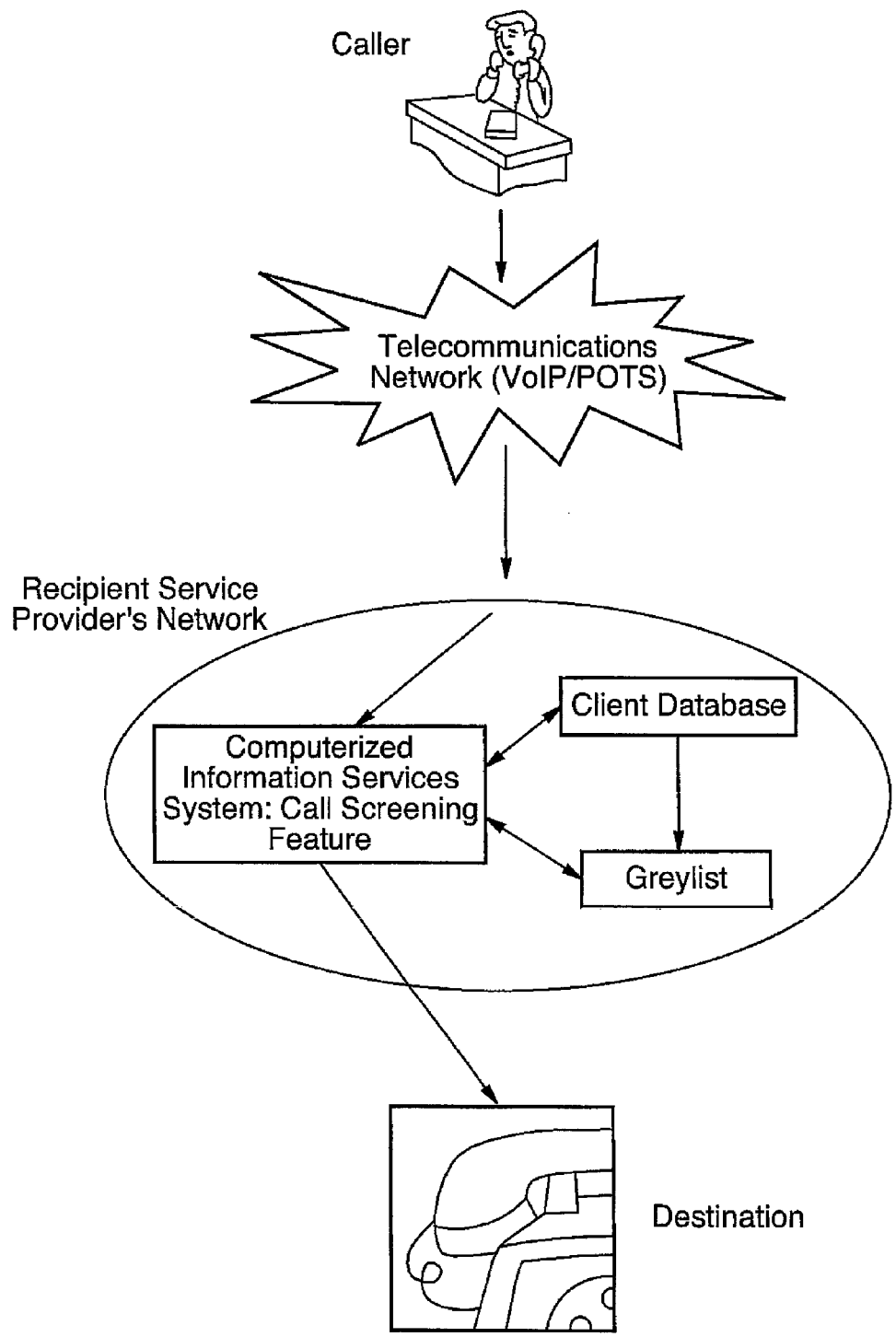
FIG. 4 is a schematic illustration of how an inbound call may be treated in the system of FIGS. 2A, 2B, 2C and 2D.

As shown in FIG. 4, the client database is part of the service provider's network and stores the user's telephone number, whitelist and blacklist amongst other things. It exchanges data with the service provider's information services system and provides the greylist with data such as query results. When a customer subscribes to the call screening service, and thereby becomes a user, a record identifying the subscriber and associated with the subscriber's assigned telephone number is added to the client database.

An exemplary embodiment of the invention is explained below by way of non-limiting example, in accordance with the exemplary embodiment shown in the drawings. It will be appreciated that the particular selection of parameters such as keystrokes, menus, functions, prompts, commands and others may be varied without departing from the principles of the invention, and the invention is not intended to be limited thereby.

Figure 2A:
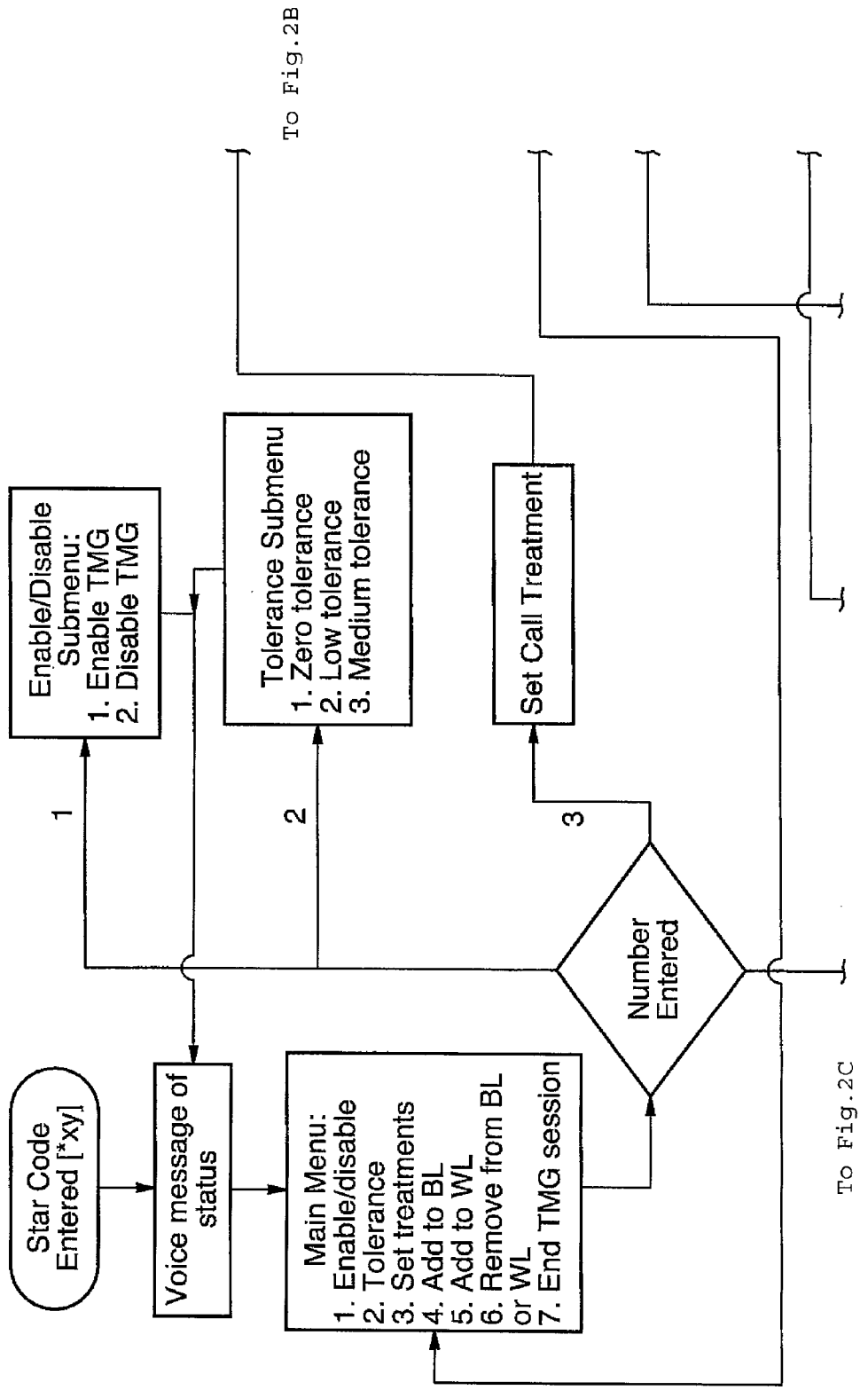
Figure 2C:
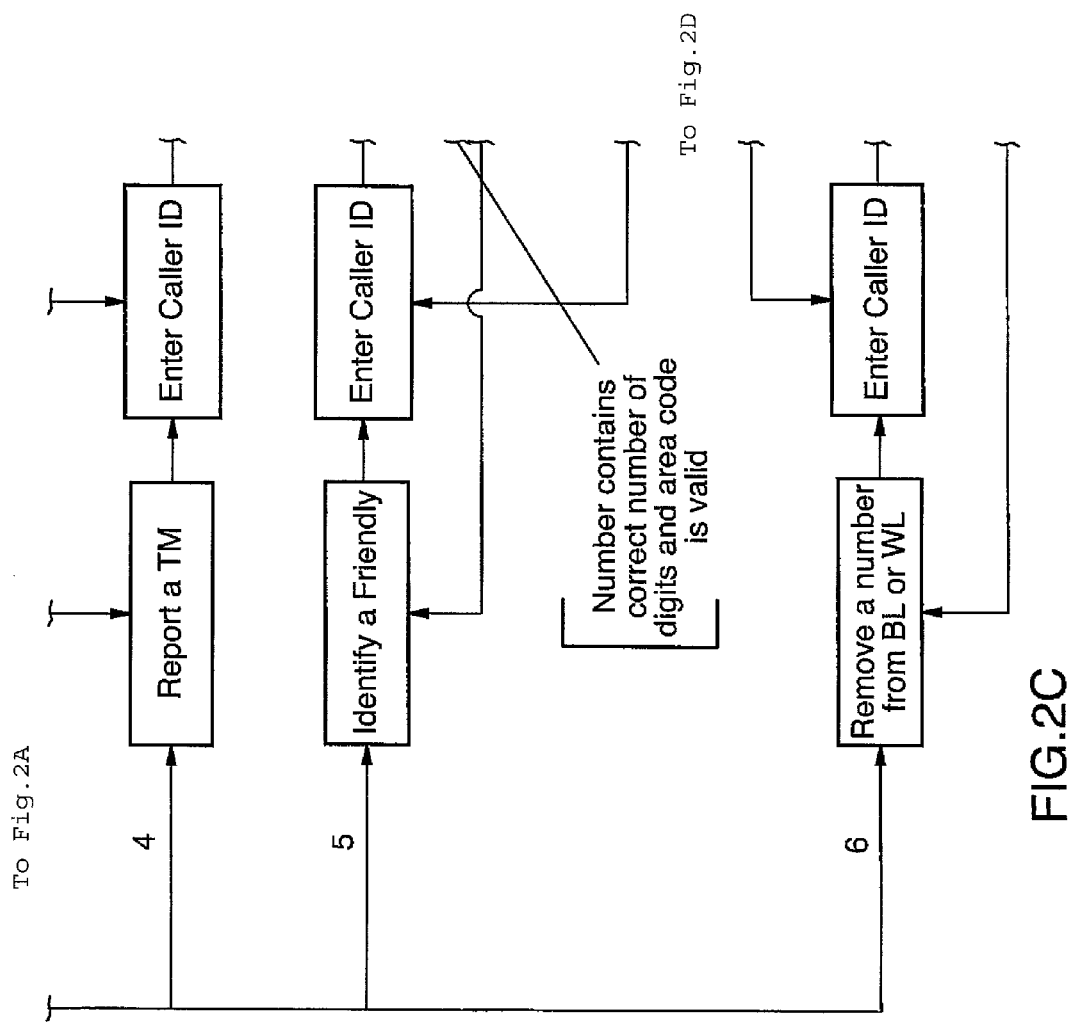
Figure 2D:
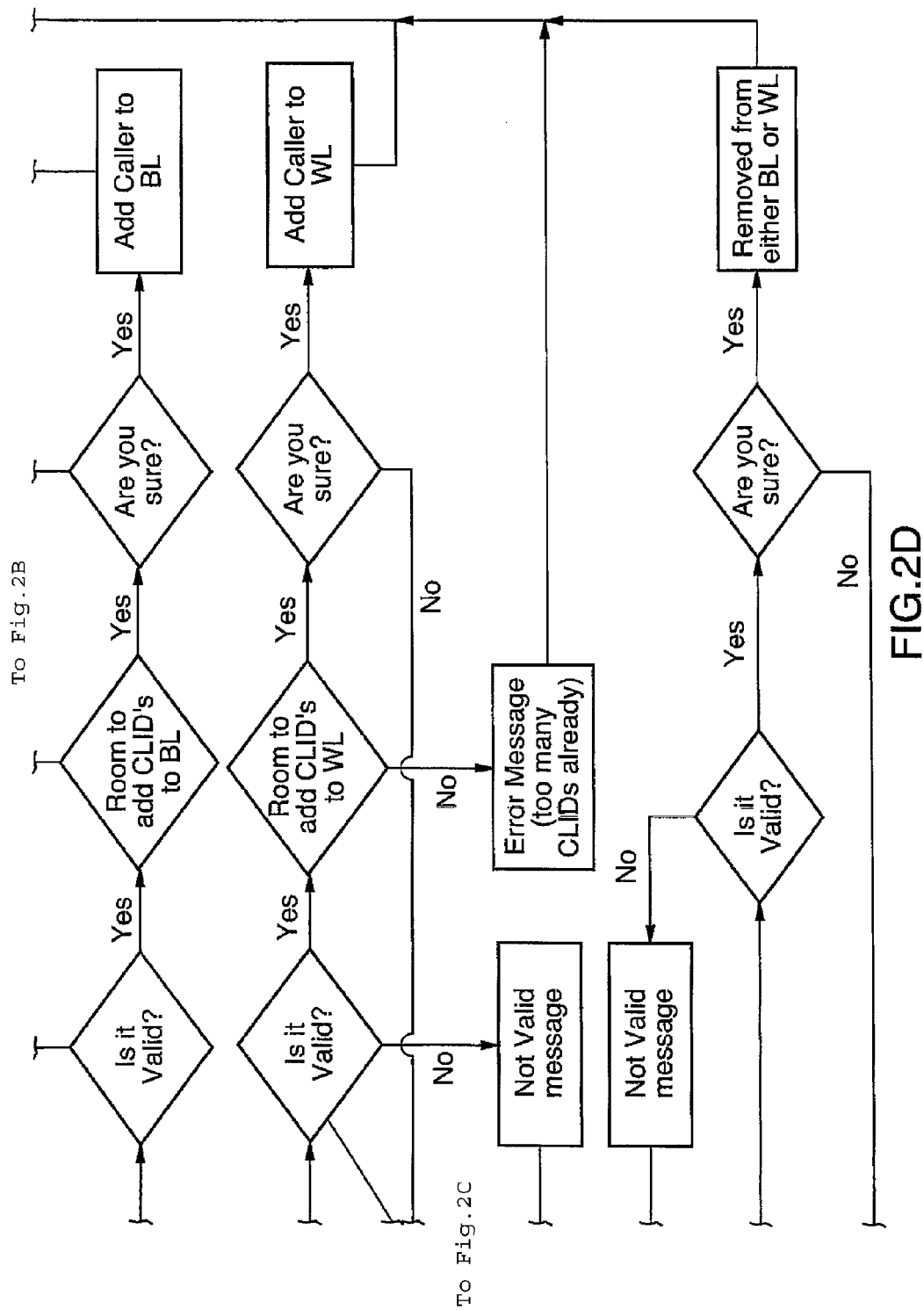
Figure 3:
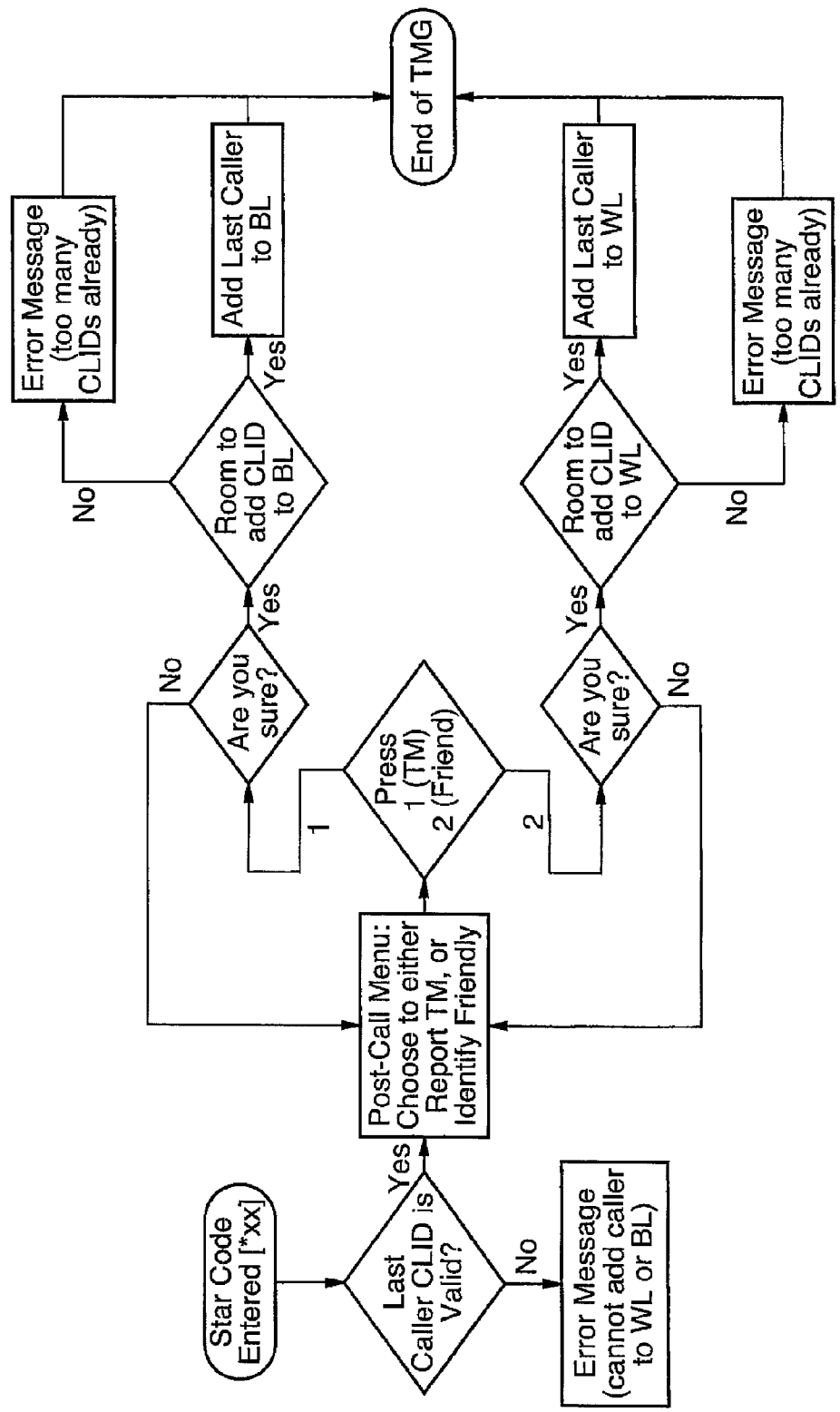
FIG. 3 is a flowchart depicting an embodiment of a post-call management system according to the invention.

A user can add CLIDs to their blacklist and whitelist by manually entering the phone numbers to be accepted or blocked, for example using the dial pad on their telephone via the call screen management system (as shown in FIG. 2) or by reporting the last caller through the same or a separate call screen management system after the call is complete (as in FIG. 3). To gain access to the call screen management system menu, the user dials a unique preset code, e.g., "*555." In either case this information is communicated to the Telco server, which applies the rules to the data received from the subscriber to add the CLID to the grey list, remove the CLID from the grey list, or modify the screening value or 'score' assigned to the CLID on the greylist, which facilitates the ability to set individual subscriber tolerance levels.

The following are some tools which may be accessed through menus in an automated attendant system. These examples are provided solely for illustrative purposes and are not to be construed as essential or an exhaustive list.

When the call screen management system is first accessed, the user will be guided by an automated attendant (such as is commonly known to those skilled in the art) through a series of menus to set up their call screening system. The user will hear a voice message indicating the status of their call screen management service, then a pre-recorded main menu, indicating to the user which number to press on their dial pad to change certain settings in the system. FIGS. 2A, 2B, 2C and 2D depict an example of how the menu system can work in this embodiment of the invention. The user can be presented with the option of pressing "1" to access the Enable/Disable setting, pressing "2" to set the tolerance to be applied to the greylist scores (various thresholds for the list transfer parameters may be established by the telco), pressing "3" to set the desired method of treating the call, pressing "4" to add a telemarketing number to the user's blacklist and have the number reported to the greylist database, pressing "5" to identify a number to be added to the whitelist, pressing "6" to remove a number from the user's whitelist or blacklist, or pressing "7" to exit the call screen management system, etc.

In an example of a submenu, if the user presses "1" from the main menu, they would be presented with the options of pressing "1" to turn the call screening system on, or pressing "2" to turn the call screening system off. If the user then presses "1" they would hear a pre-recorded message confirming that the system has been enabled. If the user presses "2" they would hear a pre-recorded message confirming that the system has been disabled. The user would then be redirected to the main menu.

If the user presses "2" from the main menu to set their desired greylist tolerance, they would be presented with the option of pressing "1" to never allow any calls through from CLIDs that have ever been marked as a telemarketer, pressing "2" to only allow callers through who have a score less than $\beta_1$, pressing "3" to only allow callers through who have a score less than $\beta_2$ (where $\beta_2 > \beta_1$), or pressing "*" to return to the main menu. $\beta_1$ and $\beta_2$ are threshold score values set by the service provider for the low score tolerance and the medium score tolerance respectively. If the user selects anything other than "*" their selection will be confirmed and they will be redirected to the main menu.

If the user presses "3" from the main menu to set how they wish to handle calls screened by the system, they will be presented with the options of pressing "1" to end the call (either immediately or after a predetermined interval, as shown), without the call ringing through, pressing "2" to require the caller to announce their identity and allow the user to accept or reject the call, pressing "3" to play a message indicating that the user does not accept telemarketing calls and to then pass the call through as a conventional call, pressing "4" to play a message indicating that the user does not accept telemarketing calls and to then send the caller through to the voicemail (VM) system (if the user has subscribed to such service), or pressing "*" to return to the main menu. If the user selects anything other than "*", their selection will be confirmed and they will be redirected to the main menu.

If the user pressed "4" from the main menu, they will be prompted to enter the 7- or 10-digit telephone number of the telemarketer (TM) they want to add to their blacklist and thereby have reported to the greylist. The user will have the option of pressing "*" to return to the main menu. If the user enters a valid 7- or 10-digit number and there is room available on the user's blacklist, the number will be read back to the user and the user will be prompted to confirm that they want to add the number to their blacklist. If the user confirms that they wish to add the number to their blacklist, the number is added to the blacklist and a message is played to indicate that the number has been so added. The user will then be redirected to the main menu. If the user does not wish to proceed with adding the number that they entered onto their blacklist, they will be redirected back to the blacklist submenu. If the number that they enter is invalid, a message will be played to indicate that the number is invalid and the user will be redirected back to the blacklist submenu. If there is insufficient room on the user's blacklist for the number, an error message will be played and the user will be redirected to the main menu.

If the user pressed "5" from the main menu, they will be prompted to enter the 7- or 10-digit telephone number of the friend or family member, or other acceptable caller, which they want to add to their whitelist. The user will have the option of pressing "*" to return to the main menu. If the user enters a valid 7- or 10-digit number, the number will be read back to the user and the user will be prompted to confirm that they want to add the number to their whitelist. If the user confirms that they wish to add the number to their whitelist and there is room available on the user's whitelist, a message will be played to indicate that the number has been so added. The user will then be redirected to the main menu. If the user does not wish to proceed with adding the number that they entered onto their whitelist, they will be redirected back to the whitelist submenu. If the number that they enter is invalid, a message will be played to indicate that the number is invalid and the user will be redirected back to the whitelist submenu. If there is insufficient room on the user's whitelist for the number, an error message will be played and the user will be redirected to the main menu.

If the user pressed "6" from the main menu, they will be prompted to enter the 7- or 10-digit telephone number of the party they wish to remove from either their whitelist or blacklist. The user will have the option of pressing "*" to return to the main menu. If the user enters a valid 7- or 10-digit number, the number will be read back to the user and the user will be prompted to confirm that they want to remove the number from their whitelist or blacklist. If the user confirms that they wish to remove the number from their whitelist or blacklist, a message will be played to indicate that the number has been removed. The user will then be redirected to the main menu. If the user indicates that they do not wish to proceed with removing the number that they entered, they will be redirected back to the submenu for removing a number. If the number that they enter is invalid, a message will be played to indicate that the number is invalid and the user will be redirected back to the submenu for removing a number.

The call screen management system may also provide the user with the option of hearing the numbers or names associated with the numbers on their blacklist and/or whitelist.

By entering another preset series of keystrokes, for example a *-number code, the user can access a post-call management tool that will add the last caller to their blacklist or whitelist (as in FIG. 3). Once the user gains access to this tool by dialing the assigned series of keystrokes, they will be given the option of reporting the last caller as a telemarketer and adding the number to their blacklist, or adding the last caller to their whitelist if the last CLID is valid. The user will then be prompted to confirm that they wish to take the action requested. If the user affirms their request and there is room on the appropriate list, the number will be added to the appropriate list. If the user responds in the negative, they will be redirected to the main menu. If there is no room left on the list to add another number, an error message will be played and the call management session terminated. If the last CLID is invalid, an error message will be played and the call management session will be terminated.

All of the settings selected by the user may be stored in the client database at the Telco server.

At any menu, if the user fails to make a selection, the menu will replay a preset number of times and await a selection, failing which the session is terminated.

Figure 5A:
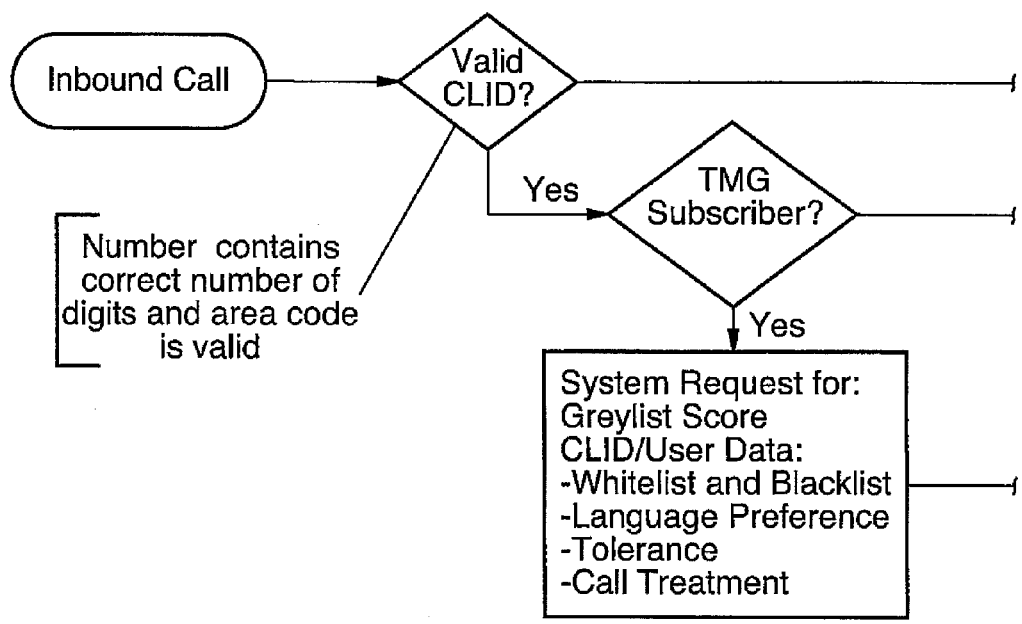
FIGS. 5A and 5B illustrate a flowchart of the call process flow through the call screening system in the system of FIGS. 2A, 2B, 2C and 2D.
Figure 5B:
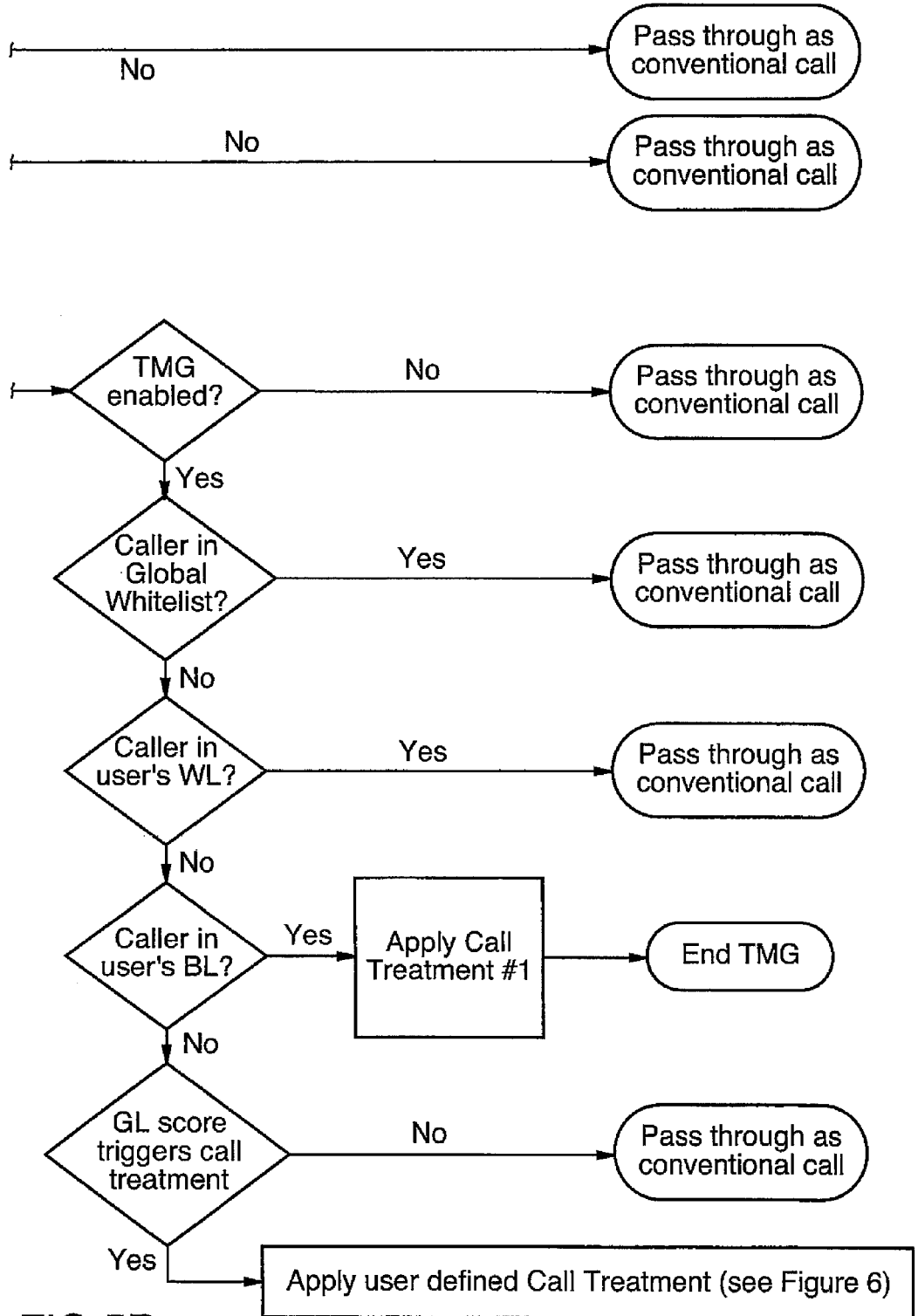

FIGS. 5A and 5B show how an inbound call may be processed. When an inbound call is detected, the system first checks to see that the CLID is valid, then the call screening system will look up the recipient telephone number in the client database and retrieve the user's settings. If the database indicates that the user has disabled the call screening system, the inbound call does not have a valid CLID, or the caller's CLID is on the user's whitelist, the inbound call will be connected to the recipient as any conventional call.

If the call screening system is enabled and the inbound call has a valid CLID, the Telco server software will conduct a lookup to determine whether the CLID is on the various lists maintained by the system. If the CLID is on the global or user's whitelist, the Telco server software will route the call through to the subscriber telephone line. If the caller's CLID is on the user's blacklist, then the incoming call is automatically terminated.

Figure 6A:
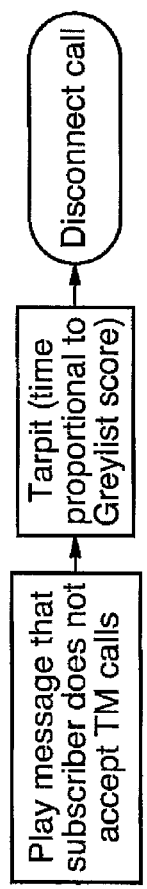
FIGS. 6A, 6B, 6C and 6D illustrate flowcharts of the processing options of a call flagged as being from a telemarketer (TM) in the system of FIGS. 2A, 2B, 2C and 2D.

If the CLID is already on the greylist, the Telco server software will retrieve the current score associated with the CLID on the greylist. If no entry is found for the CLID, the Telco software will add it to the greylist and assign a default score of 1 to the CLID. If the score is below the level of tolerance selected by the subscriber, the call is routed to the subscriber as a conventional call. If the score is equal to or above the level of tolerance selected by the user, the call is flagged and the call treatment selected by the user is applied, as shown in FIG. 6A pre-selected the option of ending calls flagged as being from a telemarketer, the call is terminated (either immediately or after a predetermined interval).

Figure 6B:
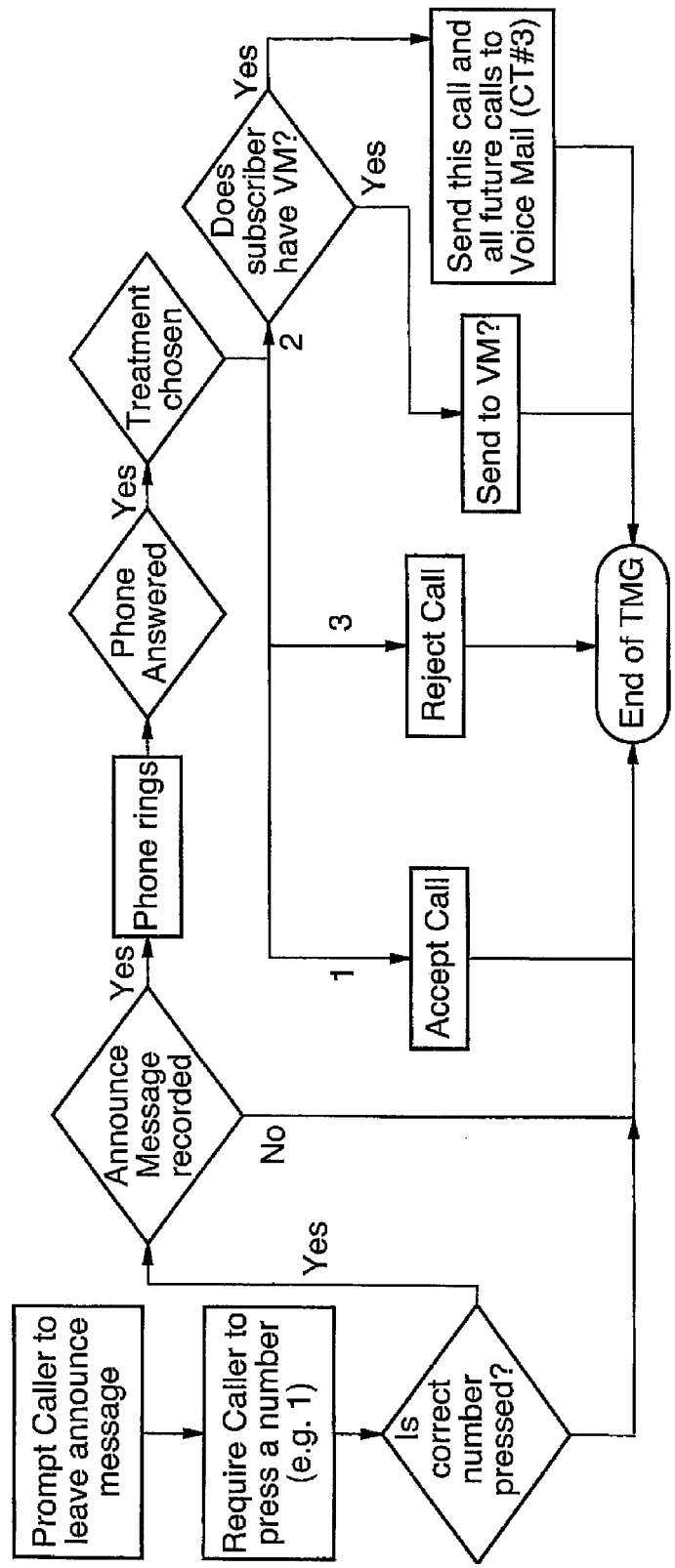
Figure 6C:
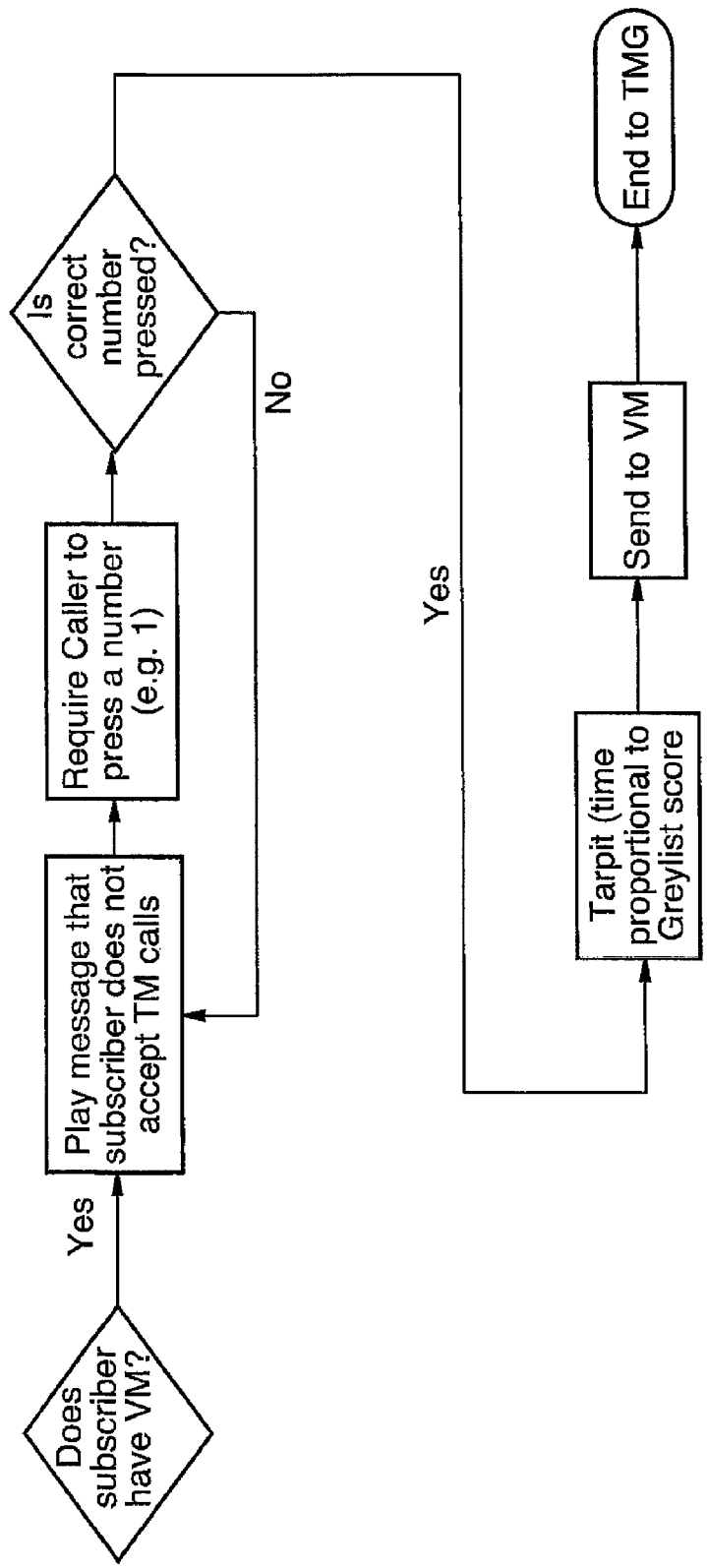

If the user pre-selected the option of sending flagged calls to voicemail, the pre-recorded message addressed to telemarketers is played to the caller (as illustrated in FIG. 6C). The caller is then presented with the option of pressing "1" to record a voice message to the recipient or pressing "2" to end the call. If the caller enters "1", they are put on hold for an interval proportional to the greylist score (sometimes known as "tarpitting") before being forwarded to the user's voicemail service. If the caller pressed "2", the call is terminated immediately.

Figure 6D:
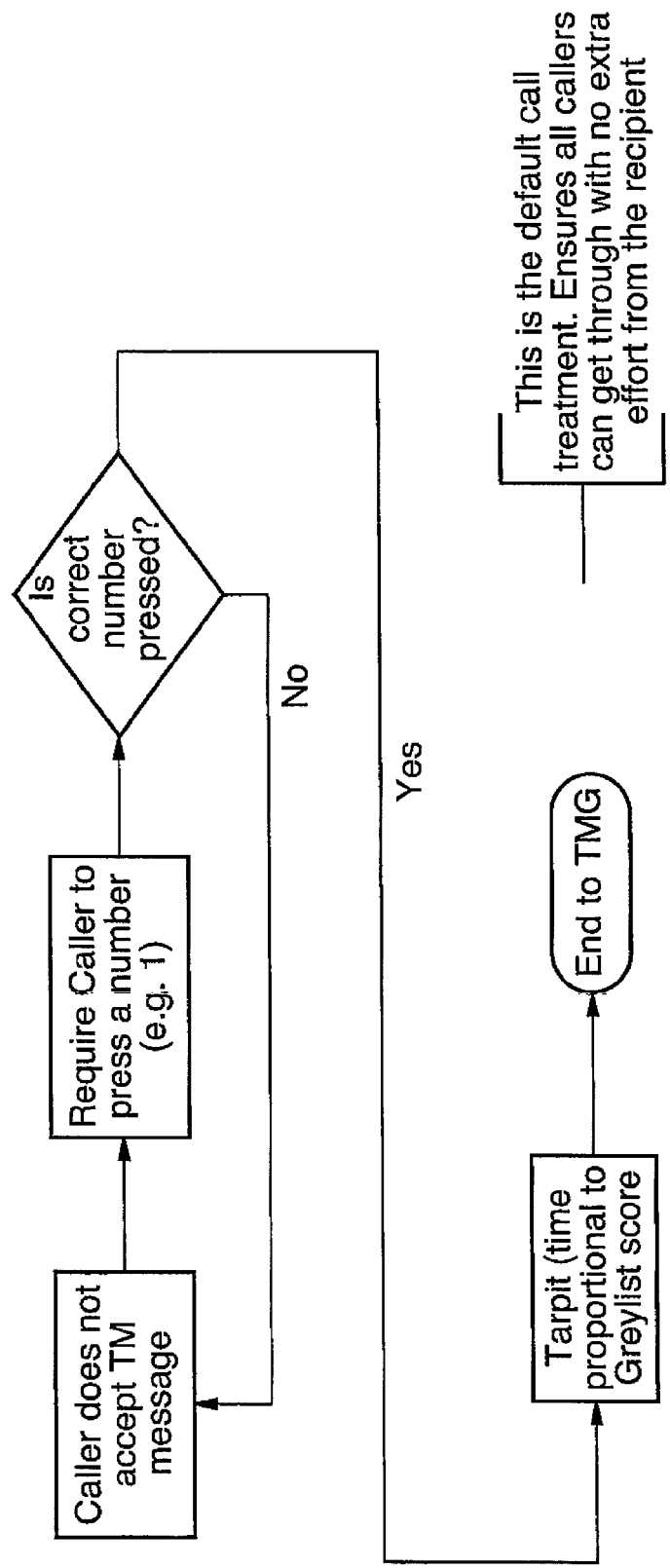

If the user pre-selected the option of accepting telemarketing calls (the default setting illustrated in FIG. 6D), the pre-recorded message addressed to telemarketers is played to the caller, then the caller will be presented with the option of pressing "1" to proceed with the call or pressing "2" to end the call. If the caller enters "1", they are put on hold for a period of time proportional to the greylist score before being passed through to the user as a conventional call. If no message has been recorded by the caller, the call is terminated. If "2" is selected, the call is terminated.

If the user pre-selected the option of requesting that a greylist caller announce themselves (as illustrated in FIG. 6B), a pre-recorded message will be played to the caller giving the caller the option of pressing "1" to leave a message announcing their identity for the recipient, or pressing "2" to end the call. If the user presses "1" they will be prompted to record a message. The screening system will then call the subscriber and play the recorded message, optionally identifying the caller as a potential telemarketer. If the call is not answered, the call will continue as a conventional call, perhaps being redirected to the user's voicemail system. If the call is answered, the user will then be given the option to press "1" to receive the call, press "2" to forward the call to voicemail, press "3" to terminate the call, or press "4" to play a pre-recorded message that the user does not accept telemarketing calls and then terminate the call.

Internet telephony subscribers may have the option of accessing their call screen management tool via the service provider's website. Similar settings can be presented through that medium.

In a further embodiment of the invention, all CLIDs are maintained in the greylist with a default screening value, and the screening value of a particular CLID is modified as data relating to the CLID is received from subscribers.

Various embodiments of the present invention having been thus described in detail by way of example, it will be apparent to those skilled in the art that variations and modifications may be made without departing from the invention.

What is claimed is:

1. A method of screening telephone calls, comprising:
   a. maintaining a screening list of telephone numbers assigned to suspect callers;
   b. storing one or more rules defining when to modify a screening value assigned to the caller's assigned telephone number on the screening list;
   c. maintaining, in association with each of the plurality of subscribers, a blacklist of caller's assigned telephone numbers which are blocked and a whitelist of caller's assigned telephone numbers which are not blocked;
   d. receiving data relating to suspect callers,
      wherein some of the data is received from a plurality of subscribers,
      wherein some of the data is received from a service provider, a system administrator or a combination thereof, and
      wherein some of the data is received from the blacklists and whitelists associated with the plurality of subscribers;
   e. applying the one or more rules to the data;
   f. modifying the screening value assigned to the caller's assigned telephone number, based on the application of the one or more rules to the data and
   g. screening a call from the caller's assigned telephone number to one of the subscribers in accordance with the one or more call screening rules based on the caller's assigned telephone number being in the screening list or on the screening value assigned to the caller's assigned telephone number, or both and a comparison of the screening value assigned to the caller's assigned telephone number and a subscriber tolerance level.

2. The method of claim 1 wherein one of a plurality of options for blocking, allowing or announcing the call is performed based on the subscriber tolerance level.

3. A system for screening telephone calls to a subscriber telephone number, comprising:
   at least one database, for maintaining a screening list of telephone numbers assigned to suspect callers and one or more rules defining when modify a screening value to be assigned to the caller's assigned telephone number on the screening list, and for maintaining, in association with each of the plurality of subscribers, a blacklist of caller's assigned telephone number which are blocked and a whitelist of caller's assigned telephone numbers which are not blocked; and
   a data processing device, for receiving data relating to suspect callers, wherein some of the data is received from a plurality of subscribers, some of the data is received from, a service provider, a system administrator or a combination thereof, and some of the data is received from the blacklists and whitelists associated with the plurality of subscribers, and applying the one or more rules to the data, and to modifying the screening value assigned to the caller's assigned telephone number based on the application of the one or more rules to the data; and
   screening a call from the caller's assigned telephone number to one of the subscribers in accordance with one or more call screening rules, based on the screening value assigned to the caller's assigned telephone number, and a comparison of the screen value assigned to the caller's assigned telephone number and a subscriber tolerance level.

4. The system of claim 3 wherein the data processing device screens a call from the caller's assigned telephone number to a subscriber based on a preset subscriber tolerance level.

5. A computer program product embodied on a tangible medium for operation on telecommunications hardware for carrying out a method of screening telephone calls, the program product operative to carry out the steps of:

a. maintaining on memory in the telecommunications hardware, a screening list of telephone numbers assigned to suspect callers;
b. storing on memory in the telecommunications hardware, one or more rules defining when to modify a screening value to be assigned to the caller's telephone number on the screening list,
c. assigning the caller's assigned telephone number to a blocked caller list or to a list of acceptable callers based on input by a subscriber to the telecommunications hardware;
d. receiving data relating to suspect callers, wherein some of the data is received from a plurality of subscribers, wherein some of the data is received from a service provider, a system administrator or a combination thereof, and wherein some of the data is received from the blacklists and whitelists associated with the plurality of subscribers;
e. applying the one or more rules to the data;
f. adding to or removing from the screening list the caller's assigned telephone number, or modifying the screening value assigned to the caller's assigned telephone number, or both, based on the application of the one or more rules to the data; and
g. screening a call from the caller's assigned telephone number to one of the subscribers in accordance with one or more call screening rules based on the caller's assigned telephone number being in the screening list or on the screening value assigned to the caller's assigned telephone number, and a subscriber tolerance level based on the screening value.

6. The computer program product of claim 5 wherein one of a plurality of options for blocking, allowing or announcing the call is performed based on the subscriber tolerance level.

7. The method of claim 1, wherein the data received from the plurality of subscribers include caller's assigned telephone numbers common to plural subscribers blacklists.

8. The system of claim 3, wherein the data received from the plurality of subscribers include caller's assigned telephone numbers common to plural subscribers blacklists.

9. The computer code product of claim 5, wherein the data received from the plurality of subscribers include caller's assigned telephone numbers common to plural subscribers blacklists.

10. A method of screening telephone calls, comprising the steps of:
a. maintaining a common screening list of telephone numbers assigned to suspect callers;
b. storing one or more rules defining when a caller's assigned telephone number will be added to or removed from the common screening list; or and modifying a screening value to be assigned to the caller's assigned telephone number on the screening list, or both;
c. receiving data relating to suspect callers, wherein some or all of the data is received from a plurality of subscribers, a service provider, a system administrator or a combination thereof and wherein the data is also related to a suspect callers' interaction with plural subscribers of the plurality of subscribers;
d. applying the one or more rules to the data;
e. adding to or removing from the common screening list the caller's assigned telephone number, or and modifying the screening value assigned to the caller's assigned telephone number, or both, based on the application of the one or more rules to the data; and
f. screening a call from the caller's assigned telephone number to one of the plurality of subscribers in accordance with one or more call screening rules based on the caller's assigned telephone number being in the common screening list or and on the screening value assigned to the caller's assigned telephone number, or both
wherein the common screening list is the same for the plurality of subscribers.

* * * * *